United States Patent
Chen et al.

(10) Patent No.: US 11,362,887 B2
(45) Date of Patent: Jun. 14, 2022

(54) MONITORING METHOD BASED ON INTERNET OF THINGS, FOG COMPUTING TERMINAL AND INTERNET OF THINGS SYSTEM

(71) Applicant: Wistron Corporation, New Taipei (TW)

(72) Inventors: Chih-Ming Chen, New Taipei (TW); Yen-Chuan Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 329 days.

(21) Appl. No.: 15/709,475

(22) Filed: Sep. 20, 2017

(65) Prior Publication Data
US 2018/0337820 A1 Nov. 22, 2018

(30) Foreign Application Priority Data
May 16, 2017 (TW) .................. 106116150

(51) Int. Cl.
*G06F 15/173* (2006.01)
*H04L 41/08* (2022.01)
(Continued)

(52) U.S. Cl.
CPC ............. *H04L 41/08* (2013.01); *H04L 41/12* (2013.01); *H04L 41/16* (2013.01); *H04L 67/10* (2013.01);
(Continued)

(58) Field of Classification Search
CPC ....... H04L 41/08; H04L 41/12; H04L 41/145; H04L 41/16; H04L 67/10; H04L 67/125;
(Continued)

(56) References Cited

U.S. PATENT DOCUMENTS 8,719,812 B1 * 5/2014 Myers ................. G06F 8/64
717/174
10,447,683 B1 * 10/2019 Loladia ................ H04W 12/63
(Continued)

FOREIGN PATENT DOCUMENTS

CN 103795723 5/2014
CN 106101199 11/2016
(Continued)

OTHER PUBLICATIONS

"Office Action of Taiwan Counterpart Application," dated Apr. 23, 2018, p. 1-p. 9, in which the listed references were cited.
(Continued)

*Primary Examiner* — Chris Parry
*Assistant Examiner* — Dixon F Dabipi
(74) *Attorney, Agent, or Firm* — JCIPRNET

(57) ABSTRACT

A monitoring method based on Internet of things (IoT), a fog computing terminal and an Internet of things system are provided. The fog computing terminal downloads an application package from a cloud server, downloads a general model from the cloud server through the application package, sets one or more IoT devices to a device group to receive a plurality of sensing data from the device group, and executes an incremental learning based on the sensing data and the general model to obtain an incrementally learning model for controlling the device group by the incrementally learning model.

21 Claims, 8 Drawing Sheets

(51) Int. Cl.
*H04L 41/16* (2022.01)
*H04L 41/12* (2022.01)
*H04W 4/38* (2018.01)
*H04L 67/10* (2022.01)
*H04W 4/08* (2009.01)
*H04W 4/50* (2018.01)
*H04W 4/70* (2018.01)
*H04L 41/14* (2022.01)
*H04L 67/125* (2022.01)

(52) U.S. Cl.
CPC .............. *H04W 4/08* (2013.01); *H04W 4/38* (2018.02); *H04W 4/50* (2018.02); *H04W 4/70* (2018.02); *H04L 41/145* (2013.01); *H04L 67/125* (2013.01)

(58) Field of Classification Search
CPC ........... H04W 4/08; H04W 4/38; H04W 4/50; H04W 4/70
See application file for complete search history.

(56) References Cited

U.S. PATENT DOCUMENTS

| | | | |
|---|---|---|---|
| 2015/0215297 A1* | 7/2015 | Rathod | G07F 17/0014 |
| | | | 726/7 |
| 2015/0261876 A1 | 9/2015 | Trikha et al. | |
| 2015/0334105 A1* | 11/2015 | Kessler | H04L 67/025 |
| | | | 726/5 |
| 2015/0356451 A1* | 12/2015 | Gupta | G06F 21/552 |
| | | | 706/52 |
| 2016/0182639 A1* | 6/2016 | Hong | H04L 41/0853 |
| | | | 709/201 |
| 2016/0259923 A1* | 9/2016 | Papa | G06F 21/105 |
| 2017/0192414 A1* | 7/2017 | Mukkamala | H04L 63/0823 |
| 2017/0195424 A1* | 7/2017 | Nasir | H04L 67/36 |
| 2017/0242674 A1* | 8/2017 | Hussein | G06F 8/61 |
| 2018/0063261 A1* | 3/2018 | Moghe | H04L 67/18 |
| 2018/0109428 A1* | 4/2018 | Kattepur | H04L 67/10 |
| 2018/0117446 A1* | 5/2018 | Tran | A61B 5/0022 |
| 2018/0270066 A1* | 9/2018 | Doyon | H04L 67/1008 |
| 2018/0307812 A1* | 10/2018 | Boldin | G06F 21/31 |
| 2018/0307945 A1* | 10/2018 | Haigh | G06K 9/6253 |
| 2018/0316555 A1* | 11/2018 | Salgueiro | H04L 41/0853 |
| 2019/0050746 A1* | 2/2019 | Sanketi | G06N 5/048 |
| 2019/0098104 A1* | 3/2019 | Kim | H04L 67/12 |
| 2019/0312856 A1* | 10/2019 | Friel | H04L 9/3228 |

FOREIGN PATENT DOCUMENTS

| | | |
|---|---|---|
| CN | 106295394 | 1/2017 |
| CN | 106452919 | 2/2017 |

OTHER PUBLICATIONS

"Office Action of China Counterpart Application", dated Aug. 13, 2020, p. 1-p. 10.

* cited by examiner

MONITORING METHOD BASED ON INTERNET OF THINGS, FOG COMPUTING TERMINAL AND INTERNET OF THINGS SYSTEM

CROSS-REFERENCE TO RELATED APPLICATION

This application claims the priority benefit of Taiwan application serial no. 106116150, filed on May 16, 2017. The entirety of the above-mentioned patent application is hereby incorporated by reference herein and made a part of this specification.

BACKGROUND OF THE INVENTION

Field of the Invention

The invention relates to a monitoring structure, and particularly relates to a monitoring method based on Internet of Things (IoT), a fog computing terminal and an internet of things system.

Description of Related Art

Along with quick development of the Internet, the original era of desktop computers is gradually turned to the era of portable computers, until today's era of Internet of Things (IoT). Along with evolution and innovation of science and technology, items that can be connected to the Internet are no longer limited to desktop computers, notebook computers or smart phones, but all kinds of things are expected to be connected to the Internet to facilitate control at any time.

Along with the advent of the IoT accompanied by massive data, the data is transmitted to the cloud for processing, which requires a huge bandwidth. The decentralized fog computation is just a solution for the centralized computation.

SUMMARY OF THE INVENTION

The invention is directed to a monitoring method based on Internet of Things, a fog computing terminal and an Internet of Things system, which are adapted to acquire more accurate results for specific users.

The invention provides a monitoring method based on Internet of Things including executing following steps through a fog computing terminal: downloading an application packet from a cloud server; downloading a general model from the cloud server through the application packet; setting one or a plurality of Internet of Things devices to at least one device group, and receiving a plurality of sensor data from the device group; and executing an incremental learning based on the sensor data and the general model to obtain an incrementally learning model and controlling the device group through the incrementally learning model.

The invention provides an Internet of Things system including a cloud server, a plurality of Internet of Things devices and a fog computing terminal. The cloud server provides an application packet and a general model. The fog computing terminal is connected to the cloud server and the Internet of Things devices through a network. The fog computing terminal downloads the application packet from the cloud server, downloads the general model from the cloud server through the application packet, sets one or a plurality of Internet of Things devices to at least one device group, receives a plurality of sensor data from the device group, executes an incremental learning based on the sensor data and the general model to obtain an incrementally learning model, and controls the device group through the incrementally learning model.

In an embodiment of the invention, the fog computing terminal analyzes the application packet to obtain an exchange code, an IoT application, a machine learning execution code and a profile, and the fog computing terminal transmits the exchange code to the cloud server. After the cloud server receives the exchange code, the cloud server transmits an activation code corresponding to the exchange code to the fog computing terminal.

In an embodiment of the invention, after the cloud server receives the exchange code, the cloud server determines whether the exchange code is received for the first time, and transmits the activation code corresponding to the exchange code to the fog computing terminal when determining that the exchange code is received for the first time, and does not transmit the activation code to the fog computing terminal when determining that the exchange code has ever been received before.

In an embodiment of the invention, the fog computing terminal downloads the general model from the cloud server through the IoT application, where the general model is a model trained by the cloud server in advance.

In an embodiment of the invention, the fog computing terminal includes a license server, and respectively stores the activation code to a firmware storage device and a blockchain database of the fog computing terminal through the license server.

In an embodiment of the invention, the fog computing terminal reads the activation code in the firmware storage device through the license server; reads the activation code in the blockchain database through the license server; determines whether the activation code obtained from the firmware storage device is the same to the activation code obtained from the blockchain database; and enables a function of the IoT application and sets an expiration date according to the activation code when the activation code obtained from the firmware storage device is the same to the activation code obtained from the blockchain database.

In an embodiment of the invention, the fog computing terminal sets at least one of the IoT devices to the device group through the IoT application based on the profile.

In an embodiment of the invention, after the fog computing terminal obtains the incrementally learning model, the fog computing terminal transmits the incrementally learning model to at least one of the IoT devices.

In an embodiment of the invention, the fog computing terminal uploads the sensor data of at least one of the IoT devices to the cloud server, such that the cloud server updates the general model.

In an embodiment of the invention, the fog computing terminal includes one or a plurality of edge devices, and each of the edge devices is determined to serve as at least one of a transaction node and a mining node based on a transaction volume, a computing capacity and storage capacity of each of the edge devices.

The invention provides a fog computing terminal including a storage device, a networking device and a processor. The networking device is connected to a cloud server and a plurality of IoT devices. The processor is coupled to the networking device and the storage device. The processor downloads an application packet from the cloud server through the networking device. The processor downloads a general model from the cloud server through the application packet, and stores the general model to the storage device.

Then, the processor sets at least one of the IoT devices to at least one device group, receives a plurality of sensor data through the device group, an incremental learning based on the sensor data and the general model to obtain an incrementally learning model, and controls the device group through the incrementally learning model.

According to the above description, the invention uses the fog computing terminal that is closer to the user to execute the incremental learning, so as to obtain a prediction result more suitable for a specific user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
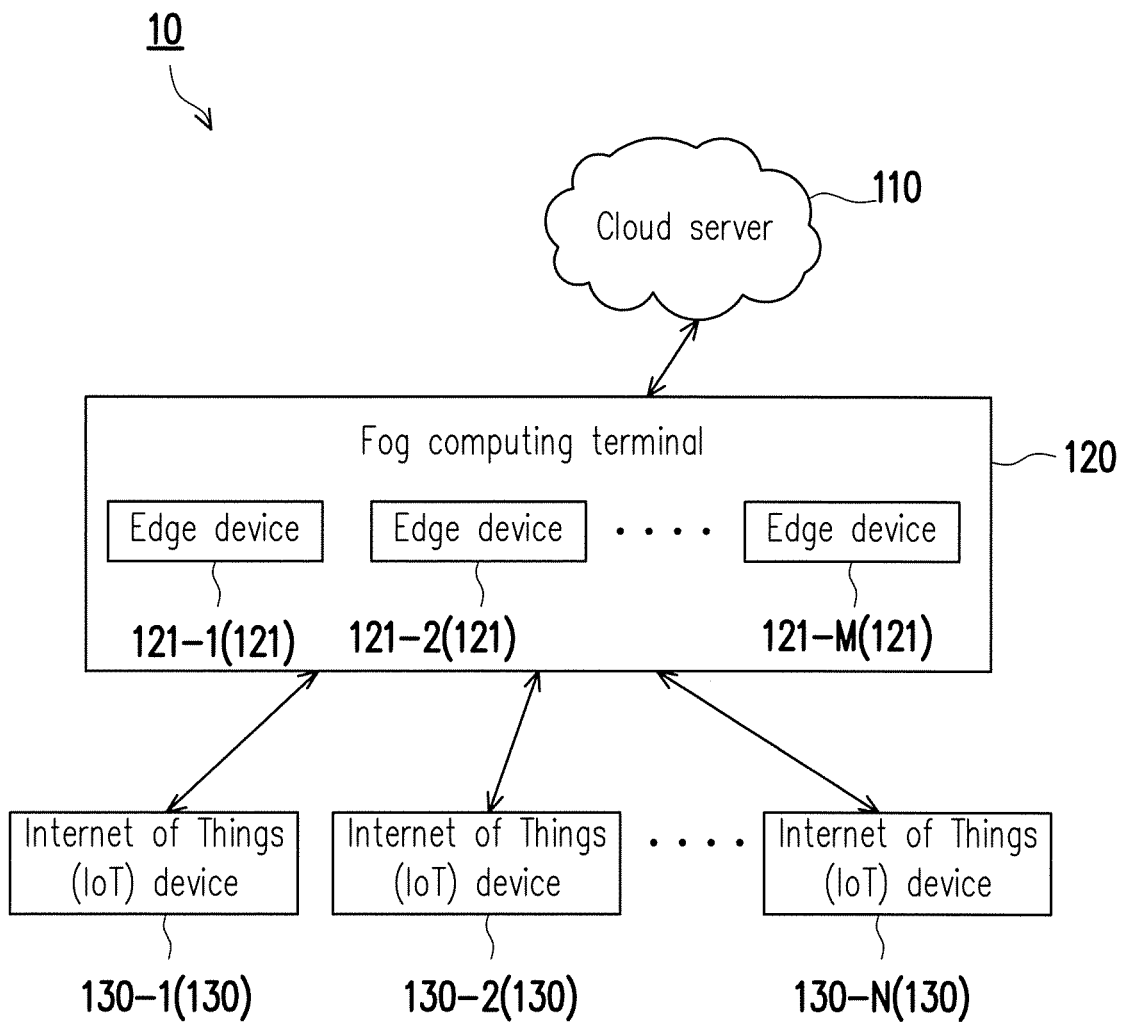
FIG. 1 is a block diagram of an Internet of Things (IoT) system according to an embodiment of the invention.

FIG. 1 is a block diagram of an Internet of Things (IoT) system according to an embodiment of the invention. Referring to FIG. 1, the IoT system 10 includes a cloud server 110, a fog computing terminal 120 and a plurality of IoT devices 130-1~130-N (which are collectively referred to as IoT devices 130). The fog computing terminal 120 is connected to the cloud server 110 and the IoT devices 130 through a network.

The cloud server 110 includes one or a plurality of hosts with powerful computing capacity, for example, servers with high computing capacity, to provide processed information or computed information, such that other clients connected to the cloud server through the network, for example, the fog computing terminal 120 or the IoT devices 130 may quickly acquire required data or results, and output the data or the results to objects requiring the same.

The fog computing terminal 120 is, for example, composed of at least one edge device. Herein, the fog computing terminal 120 includes a plurality of edge devices 121-1~121-M (which are collectively referred to as edge devices 121). The edge devices 121-1~121-M are not server-level hosts, but are computers with less performance, more dispersed distribution and various functions, for example, general desktop computers, notebook computers, tablet computers, smart phones, or other electronic device with a computation function. The edge devices 121-1~121-M can be disposed in a general office or a medical station, etc., and are unnecessary to be disposed in a specific computer room.

The IoT devices 130 are electronic devices with a weaker computing power and having a communication transmission function, for example, smart wristbands, smart watches, smart beds, smart cloths, wearable medical care devices, medical equipment, wearable health monitoring devices, etc. The fog computing terminal 120 and the IoT devices 130 can be connected through an internal network, and the fog computing terminal 120 and the cloud server 110 can be connected through an external network.

The fog computing terminal 120 adopts a fog computing technique. The fog computing technique adopts a distributed computing to distribute computation, communication, control and storage sources and services to devices or systems of users or close to the users. The fog computing technique expands a network computation mode of the cloud computation, and expands the network computation from a network center to a network edge, such that the fog computing technique can be widely applied to various services, and is an extension of a concept of the cloud computation. In the fog computing technique, end-user clients or edge devices connected to the end-user clients store data in a distributed collaborative architecture, or implement distributed network packet transmission communication, or related distributed control, operation or management in the same way.

Each of the edge devices 121 in the fog computing terminal 120 adopts a blockchain application technique. Namely, each of the edge devices 121 may serve as a transaction node or a mining node, or simultaneously serves as the transaction node and the mining node. The transaction node is used for storing a blockchain database. The mining node does not include the blockchain database, but is used for performing a verification operation to a transaction result, and packages the transaction result into a block for transmitting to the transaction node for further verification.

For example, when a certain node initiates a transaction, the node first broadcasts the transaction to other nodes, and now all of the mining nodes run a consensus algorithm to determine one of the mining nodes that gets the right for verification. The mining node that gets the right for verification packages an unreliable transaction result verified by itself into a new block and sends the new block to the transaction node, and the transaction node re-verifies the transaction. If the two verified transaction results are the same, the transaction node puts the block formed by packaging the transaction result into the blockchain database to serve as a reliable transaction.

Figure 2:
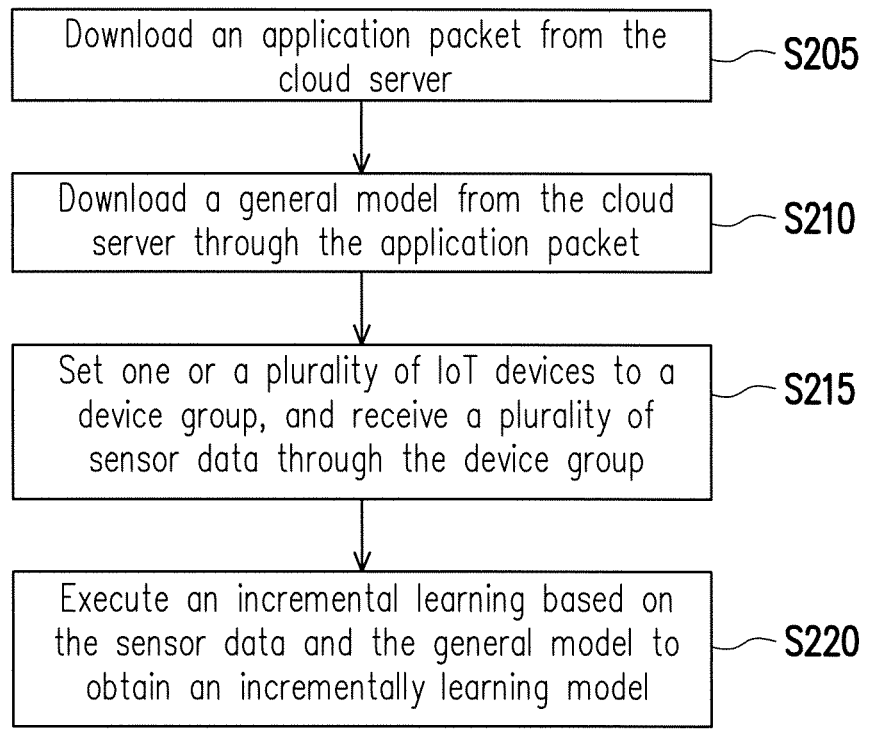
FIG. 2 is a flowchart illustrating a monitoring method based on IoT according to an embodiment of the invention.

An embodiment is provided below to describe various steps of a monitoring method based on IoT. FIG. 2 is a flowchart illustrating a monitoring method based on IoT according to an embodiment of the invention. In the present embodiment, the fog computing terminal 120 sets one or a plurality of the IoT devices 130 into one or a plurality of device groups to control the devices groups. For example, when the IoT system 10 is applied to a medical care system, the cloud server 110 is a server host set in a medical center room, the fog computing terminal 120 is a personal computer set at a nurse station, and the IoT devices 130 are various physiological sensors worn by the users. The physiological sensors are, for example, used for detecting a blood pressure, a body temperature, a heartbeat rate, a blood oxygen, a blood sugar, etc. The fog computing terminal 120 may sets one or a plurality of the IoT devices 130, for example, various physiological sensors worn by the users into a device group to monitor whether sensor data of the device group is abnormal, so as to react, control or dynamically adjust the device group.

Referring to FIG. 1 and FIG. 2, in step S205, the fog computing terminal 120 downloads an application packet from the cloud server 110. The application packet includes an exchange code, an IoT application, a machine learning execution code and a profile. The IoT application includes a simple IoT application and a composite IoT application. The composite IoT application is based on a plurality of simple IoT applications. The composite IoT application may access blockchain data of the simple IoT application, and may monitor a plurality of device groups. The machine learning execution code is used for implementing training of incremental learning in the fog computing terminal 120. The profile includes a set of metadata elements, policy and guideline, and is used for executing the IoT application and appointing the IoT device 130 to be used. For example, the metadata element is used to indicate for medical or financial, the policy is used to indicate that data needs to be backed up or requires a dual source in a medical environment, and the guideline is a medication principle.

The fog computing terminal 120 translates the profile into the device group, and some IoT devices 130 in the device group download an incrementally learning model from the fog computing terminal 120, and other IoT devices 130 in the device group uploads sensor data to the fog computing terminal 120.

Then, in step S210, the fog computing terminal 120 downloads a general model from the cloud server 110 through the application packet. Herein, the general model is a model trained by the cloud server 110 in advance. To be specific, the cloud server 110 performs batch training through the machine learning model according to representative sensor data to obtain the general model. For example, the cloud server 110 trains a general model in advance according to raw sensor data of general patients or processed (for example, aggregated or filtered) sensor data of representative patients. The general model is obtained by training representative data.

Figure 3:
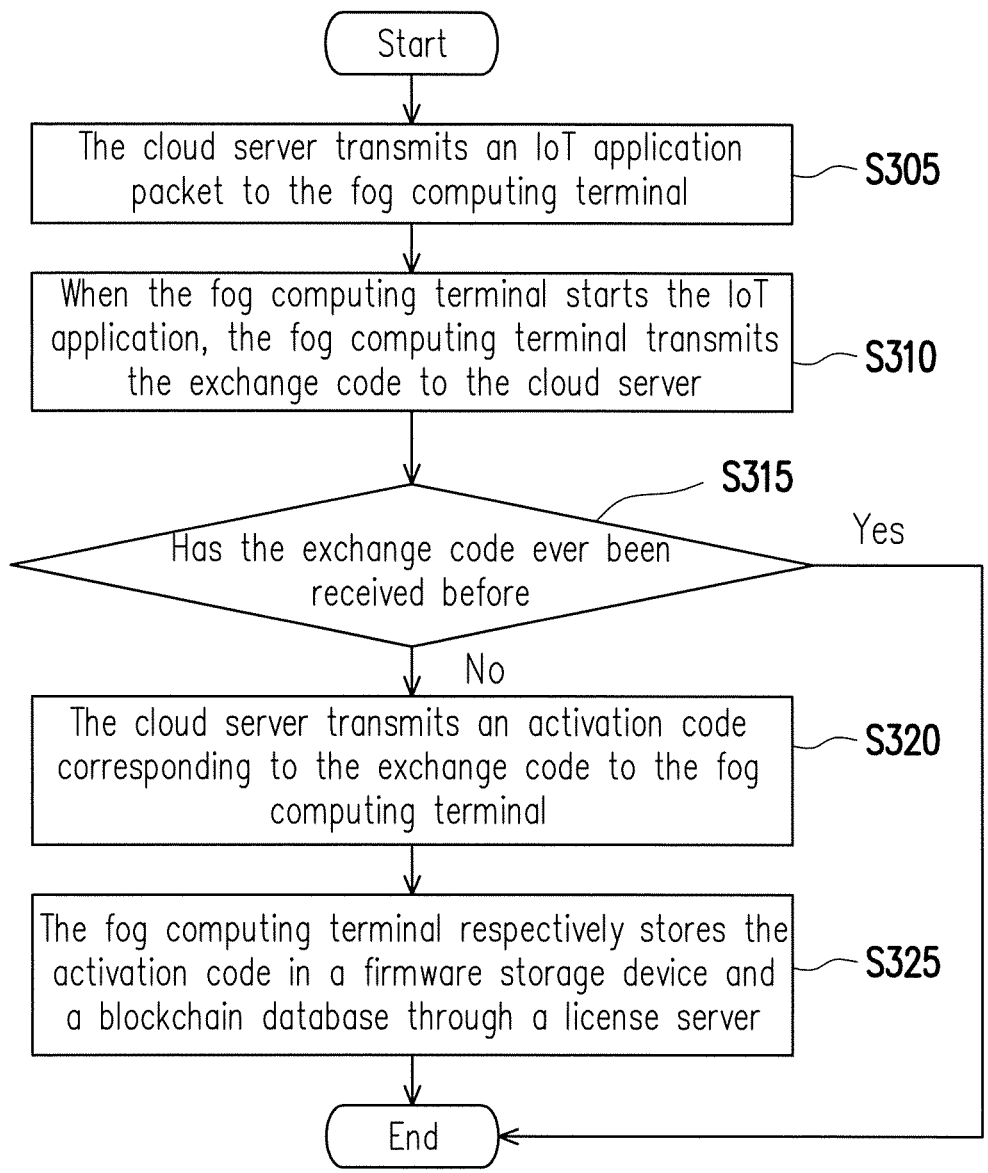
FIG. 3 is a flowchart illustrating an exchange procedure of an exchange code and an activation code according to an embodiment of the invention.

In detail, FIG. 3 is a flowchart illustrating an exchange procedure of an exchange code and an activation code according to an embodiment of the invention. In step S305, the cloud server 110 transmits an IoT application packet to the fog computing terminal 120. After receiving the IoT application packet, the fog computing terminal 120 analyzes the IoT application packet to obtain an exchange code, an IoT application, a machine learning execution code and a profile. Moreover, the IoT application, the machine learning execution code and the profile can be stored into the blockchain database to prevent tampering.

Then, in step S310, when the fog computing terminal 120 starts the IoT application, the fog computing terminal 120 transmits the exchange code to the cloud server 110. Moreover, in step S315, the cloud server 110 determines whether the exchange code has ever been received before, i.e. determines whether the exchange code is received for the first time. When it is determined that the exchange code is received for the first time, in step S320, the cloud server 110 transmits an activation code corresponding to the exchange code to the fog computing terminal 120. When it is determined that the exchange code has ever been received before, the cloud server 110 ends the exchange procedure of the exchange code and the activation code, and does not transmit any activation code to the fog computing terminal 120.

The exchange code and the activation code are used for ensuring a usage right of the IoT application, for example, a licensed available function and a corresponding expiration date. The exchange code is downloaded to the fog computing terminal 120 along with the application packet. The fog computing terminal 120 exchanges an activation code with the cloud server 110 by using the exchange code. The cloud server 110 records the exchange code that has been ever used for exchanging the activation code before, and does not again issue the activation code for the used exchange code. For example, the exchange code is assumed to be a ticket, and after the ticket is delivered to the cloud server 110, the cloud server 110 tears the ticket off, so that the used ticket cannot be used again.

Then, in step S325, the fog computing terminal 120 respectively stores the activation code in a firmware storage device and a blockchain database of the fog computing terminal 120 through a license server. Namely, the fog computing terminal 120 further includes the license server. The license server is, for example, a general desktop computer, a notebook computer, a tablet computer, a smart phone, or other various electronic devices with a computation function. Alternatively, the license server is, for example, software set in the edge device 121. By setting the license server in the fog computation terminal 120, the license server may normally operate in the internal network when the external network is interrupted.

The license server may store the activation code to a firmware storage device in the edge device 121 executing the IoT application. The firmware storage device is, for example, a memory storing a basic input/output system (BIOS). Moreover, the license server may store the activation code to the blockchain database of the transaction node.

When the cloud server 110 issues the application packet, the cloud server 110 may determine to issue the application packet to the corresponding edge device 121 according to a received instruction. Namely, not all of the edge devices 121 download the application packet. After the cloud server 110 receives the exchange code transmitted by the fog computing terminal 120, the cloud server 110 transmits the activation code corresponding to the exchange code to the fog computing terminal 120 according to data recorded therein. The fog computing terminal 120 starts a subsequent procedure only after receiving the activation code. Herein, the activation code records the licensed available function and the expiration date.

Figure 4:
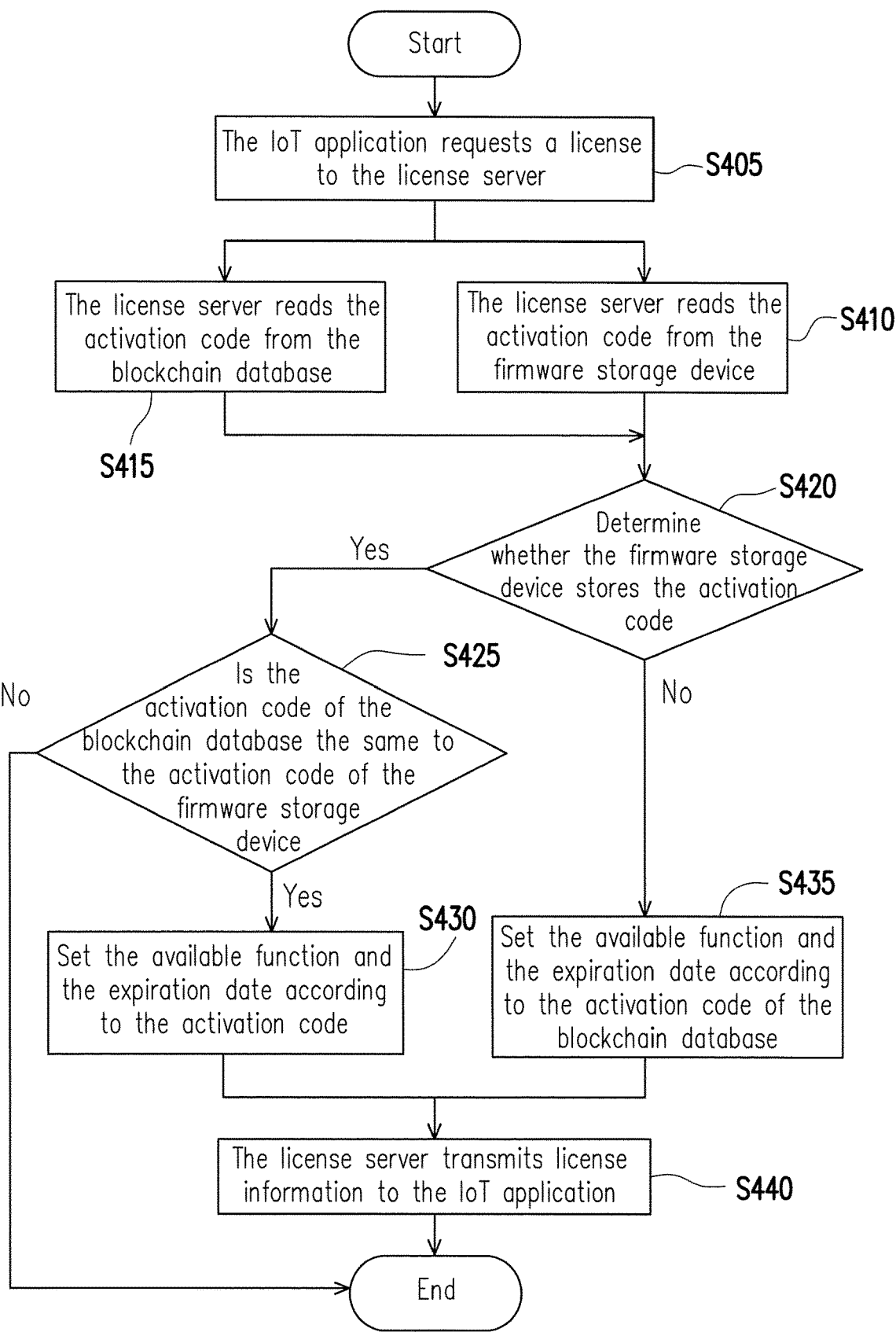
FIG. 4 is a flowchart illustrating a license procedure according to an embodiment of the invention.

FIG. 4 is a flowchart illustrating a license procedure according to an embodiment of the invention. Referring to FIG. 4, in step S405, the IoT application requests a license from the license server. Then, in step S410, the license server reads the activation code from the firmware storage device. Moreover, in step S415, the license server reads the activation code from the blockchain database. Then, in step S420, it is determined whether the firmware storage device stores the activation code.

If it is determined that the firmware storage device stores the activation code, in step S425, the license server determines whether the activation code of the blockchain database is the same to the activation code of the firmware storage device. If the activation code of the blockchain database is the same to the activation code of the firmware storage device, in step S430, the license server sets the available function and the expiration date according to the activation code. If the two activation codes are different, the license server ends the license procedure to prevent improper license due to that one of the activation codes is properly tampered.

Referring back to the step S420, if it is determined that the firmware storage device does not has the activation code, in step S435, the license server sets the available function and the expiration date according to the activation code of the blockchain database.

For example, the functions of the IoT application include heartbeat prediction, blood pressure prediction and body temperature prediction, etc. The activation code includes flags corresponding to each of the functions, and when the flag is set to 1, it is set that the corresponding function of the IoT application is the available function. For example, it is set that the function of blood pressure prediction in the IoT application is the available function.

The expiration date is used for limiting a duration that the available function of the IoT application can be used. After the expiration date, the available function of the IoT application is set as unavailable to disable such function. Moreover, different expiration dates can be set for different available functions of the IoT application. Alternatively, all of the available functions of the IoT application share a same expiration date. By setting the expiration date, a usage period of the available function can be determined according to an amount of payment.

Then, in step S440, the license server transmits license information to the IoT application, and the IoT application enables the corresponding available function and sets the expiration date.

Referring back to FIG. 2, in step S215, the fog computing terminal 120 sets one or a plurality of IoT devices 130 to a device group, and receives a plurality of sensor data (raw sensor data sensed by the device group, which is data closer to the user) from the device group. Namely, the IoT sets the appointed IoT devices 130 as the device group based on the profile.

For example, it is assumed that the IoT application predicts a blood pressure and a heartbeat of a user A, and the profile specifies to measure the blood pressure and the heartbeat of the user A, the fog computing terminal 120 sets two IoT devices 130 used for sensing the heartbeat and the blood pressure of the user A as a device group to support the function of the IoT application to be executed. Moreover, it is assumed that the profile specifies to measure a heartbeat and a body temperature of a user B, the fog computing terminal 120 sets two IoT devices 130 used for sensing the heartbeat and the body temperature of the user B as a device group to support the function of the IoT application to be executed.

Then, in step S220, the fog computing terminal 120 executes an incremental learning based on the sensor data and the general model to obtain an incrementally learning model for controlling the device group through the incrementally learning model. The fog computing terminal 120 may continually train the general model according to the sensor data (the raw sensor data) of the specified device group to obtain the incrementally learning model. For example, to use a supervised self-learning algorithm to train the general model.

For example, in a medical system, after the cloud server 110 performs training based on data of the representative patients to obtain the general model, and the general model is downloaded to the fog computing terminal 120, the fog computing terminal 120 may continually train the general model based on the raw sensor data of a specific patient to obtain the incrementally learning model. Therefore, the incrementally learning model obtained by the fog computing terminal 120 is closer to a real condition of the specific patient, so that a prediction result more complied with the specific patient can be obtained.

For example, the blood pressure of the user A or the family thereof is 5-10 mmHg higher than an average. The raw sensing data of the user A can be applied to execute training of incremental learning on the general model to obtain an incrementally learning model closer to the condition of the user A. In this way, instrument parameters can be correspondingly adjusted, for example, the instrument parameters are required to be correspondingly adjusted in case of kidney washing (hemodialysis), or a dialysis rate is required to be controlled, or drugs to be used in coordination are noticed, etc.

In the fog computing terminal 120, the sensor data received from the device group and the general model are substituted into the machine learning execution code to execute the incremental learning. The incremental learning refers to that a learning system is capable of continually learning new knowledge from new samples and preserving most of the knowledge learned before. Therefore, when new data is added, it is unnecessary to reconstruct the entire knowledge base, but only updating caused by the new data is executed based on the original knowledge base.

Moreover, after the fog computing terminal 120 obtains the incrementally learning model, the fog computer terminal 120 may transmit the incrementally learning model to one of or a plurality of the IoT devices 130 through the IoT application. For example, the incrementally learning model can be transmitted to the IoT devices 130 with higher computing power to directly run the incrementally learning model on the IoT devices 130.

Regarding the fog computing terminal 120 adopting the blockchain application technique, each of the edge devices 121 may serve as the transaction node or the mining node, or simultaneously serve as the transaction node and the mining node. The fog computing terminal 120 may determine each of the edge devices 121 to serve as at least one of the transaction node and the mining node based on a transaction volume (i.e. a data amount run or transmitted under a blockchain structure), a computing capacity and storage capacity of each of the edge devices 121. Moreover, the several edge devices 121 serving as the transaction nodes and the mining nodes can be determined through man-power deployment, deployment of the cloud server 110 or deployment of the application packet.

Moreover, regarding a specific node (the mining node or the transaction node), the fog computing terminal 120 predicts a capability corresponding to the specific node based on feature vectors such as computing capacity of a central processing unit, a hard disk storage capacity, etc. through a support vector regression (SVR) model. When a transaction volume is large, a node with higher capability is selected, and when the transaction volume is small, a node with lower capability is selected. In this way, the fog computing terminal 120 may simultaneously support a plurality of dynamic blockchain clusters, and a size of each cluster and the nodes included in each cluster can be unfixed. The SVR model can be executed in one of the edge devices 121, or run in the same edge device 121 together with the license server.

Therefore, a range or number of the transaction nodes and the mining nodes under the blockchain structure covered by the fog computing terminal 120 can be completely dynamic, which is determined according to a transaction volume at that moment. For example, the edge device 121 with higher computing capacity is adapted to serve as the milling node, and the edge device 121 with good storage capacity is adapted to serve as the transaction node.

Figure 5A:
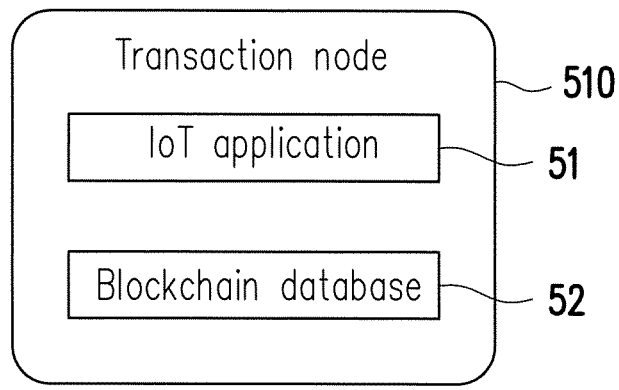
FIG. 5A is a block diagram of a transaction node according to an embodiment of the invention.
Figure 5B:
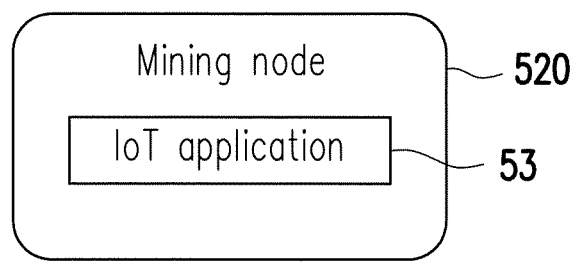
FIG. 5B is a block diagram of a mining node according to an embodiment of the invention.

For example, FIG. 5A is a block diagram of a transaction node according to an embodiment of the invention. FIG. 5B is a block diagram of a mining node according to an embodiment of the invention.

In FIG. 5A, the transaction node 510 includes an IoT application 51 and a blockchain database 52. By using a controller or a processor set in the transaction node 510 (one of the edge devices) to execute the IoT application 51, a corresponding function of the transaction node 510 is implemented.

In FIG. 5B, the mining node 520 includes an IoT application 53. By using a controller or a processor set in the mining node 520 to execute the IoT application 53, a corresponding function of the mining node 520 is implemented. The IoT application 53 of the mining node 520 is used for verifying a transaction result, for example, the IoT application 53 has a smart contract in the blockchain application technique, and the smart contract is applied to verify the transaction result, after the verification is successful, the correct transaction result is broadcasted to other transaction nodes, and the transaction result is packaged into a block. Moreover, in case of multiple mining nodes, the consensus algorithm is applied to determine one of the mining nodes to get the right for verification. For example, in case of multiple mining nodes, the mining nodes compete for priority, and the mining node (with fast processing speed) first grabbing the priority gets the right for verification.

The transaction node 510 again performs verification after obtaining the verified transaction result from the mining node 520. For example, the IoT application 51 of the transaction node 510 also has the smart contract in the blockchain application technique, and uses the smart contract to verify the transaction result. When verifications of the mining node 520 and the transaction node 510 are all successful, the transaction result is stored in the blockchain database 52 of the transaction node 510. If one of the verifications is not successful, the transaction result is not stored in the blockchain database 52. The blockchain database 52 encrypts the data by using asymmetric encryption. Each of the transaction nodes 510 has the complete blockchain database 52.

The blockchain application technique has a fault-tolerant mechanism. It is assumed that there are 3 transaction nodes 510 under a blockchain structure, when two of the transaction nodes 510 are tampered or damaged, transaction of the entire blockchain structure is not influenced, and normal inquiring, writing transactions, etc. can still be continually performed. This is because that each of the transaction nodes 510 has the complete blockchain database 52, and when only one transaction node is valid and other transaction nodes are all invalid or abnormal, the entire blockchain structure can still normally operate, and may continuously synchronize the correct transaction data. The three advantages of security, transparency and high efficiency of the blockchain structure avails development of the IoT system 10.

Figure 6:
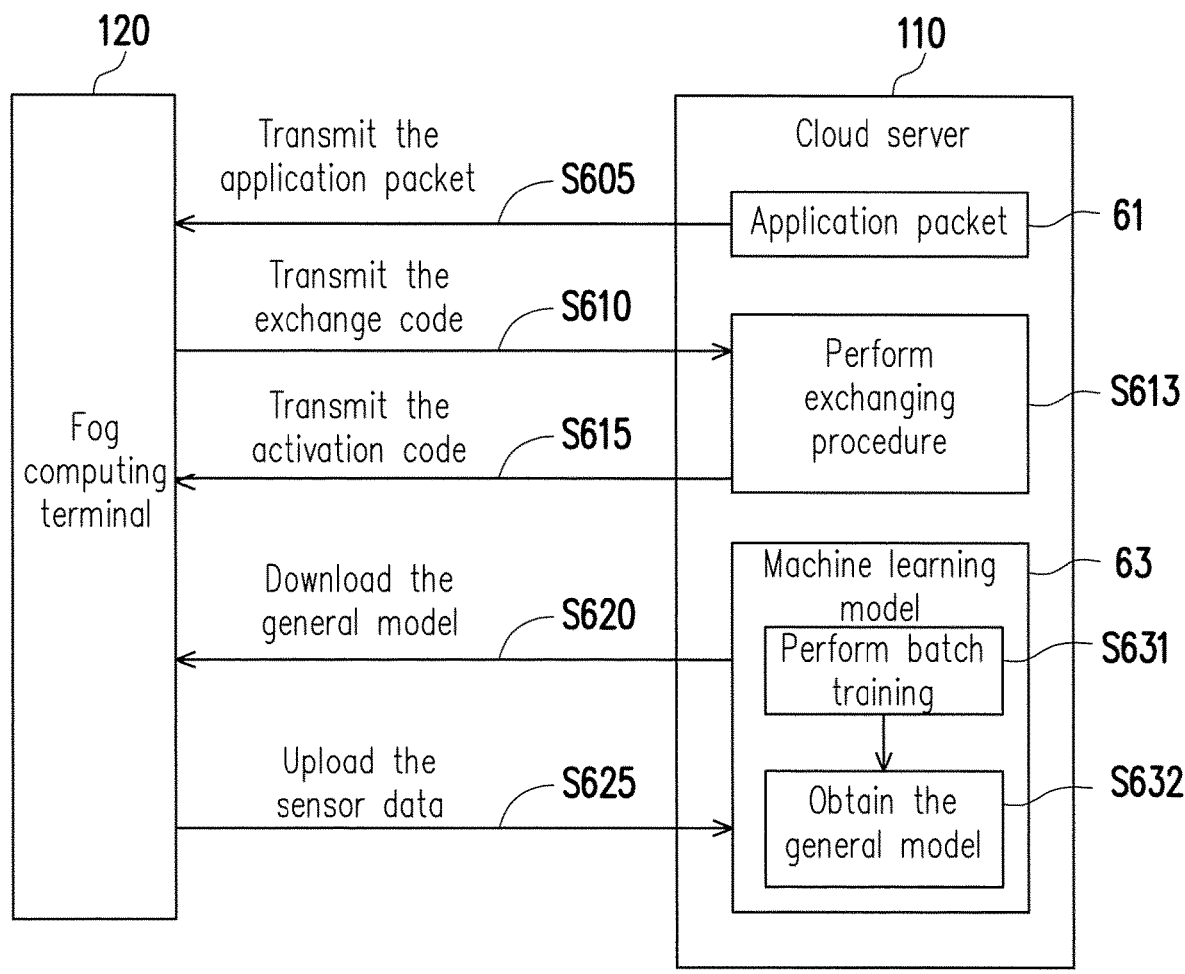
FIG. 6 is a schematic diagram of a data transmission procedure based on a cloud server in a monitoring system according to an embodiment of the invention.

FIG. 6 is a schematic diagram of a data transmission procedure based on the cloud server in a monitoring system according to an embodiment of the invention. Referring to FIG. 6, the monitoring system includes the fog computing terminal 120 and the fog server 110. In step S605, the cloud server 110 transmits an application packet 61 to the fog computing terminal 120. The fog computing terminal 120 analyzes the application packet 61 to obtain an exchange code, an IoT application, a machine learning execution code and profile. In step S610, the fog computing terminal 120 transmits the exchange code to the cloud server 110 through the IoT application.

In step S613, the cloud server 110 performs an exchanging procedure of the exchange code and an activation code. Then, in step S615, the cloud server 110 transmits the activation code to the fog computing terminal 120. To be specific, after the cloud server 110 receives the exchange code, the cloud server 110 determines whether the exchange code is received for the first time, and transmits the activation code corresponding to the exchange code to the fog computing terminal 120 when determining that the exchange code is received for the first time, and does not transmit the activation code to the fog computing terminal 120 when determining that the exchange code has ever been received before.

After the fog computing terminal 120 receives the activation code, in step S620, the fog computing terminal 120 downloads the general model from the cloud server 110. Then, the fog computing terminal 120 executes the operations as that described in the aforementioned steps S215-S220. After the fog computing terminal 120 obtains the incrementally learning model, in step S625, the fog computing terminal 120 further uploads the sensor data of the IoT device 130 to the cloud server 110 through the IoT application, such that the cloud server 110 may update the general model. The cloud server 110 performs batch training by using a machine learning model 63 (step S631), and then obtains the general model (step S632). Moreover, the cloud server 110 can be set to re-perform the batch training on the sensor data collected by the fog computing terminal 120 and the representative data originally stored in the cloud server 110 after a period of time, so as to obtain a new general model.

Figure 7:
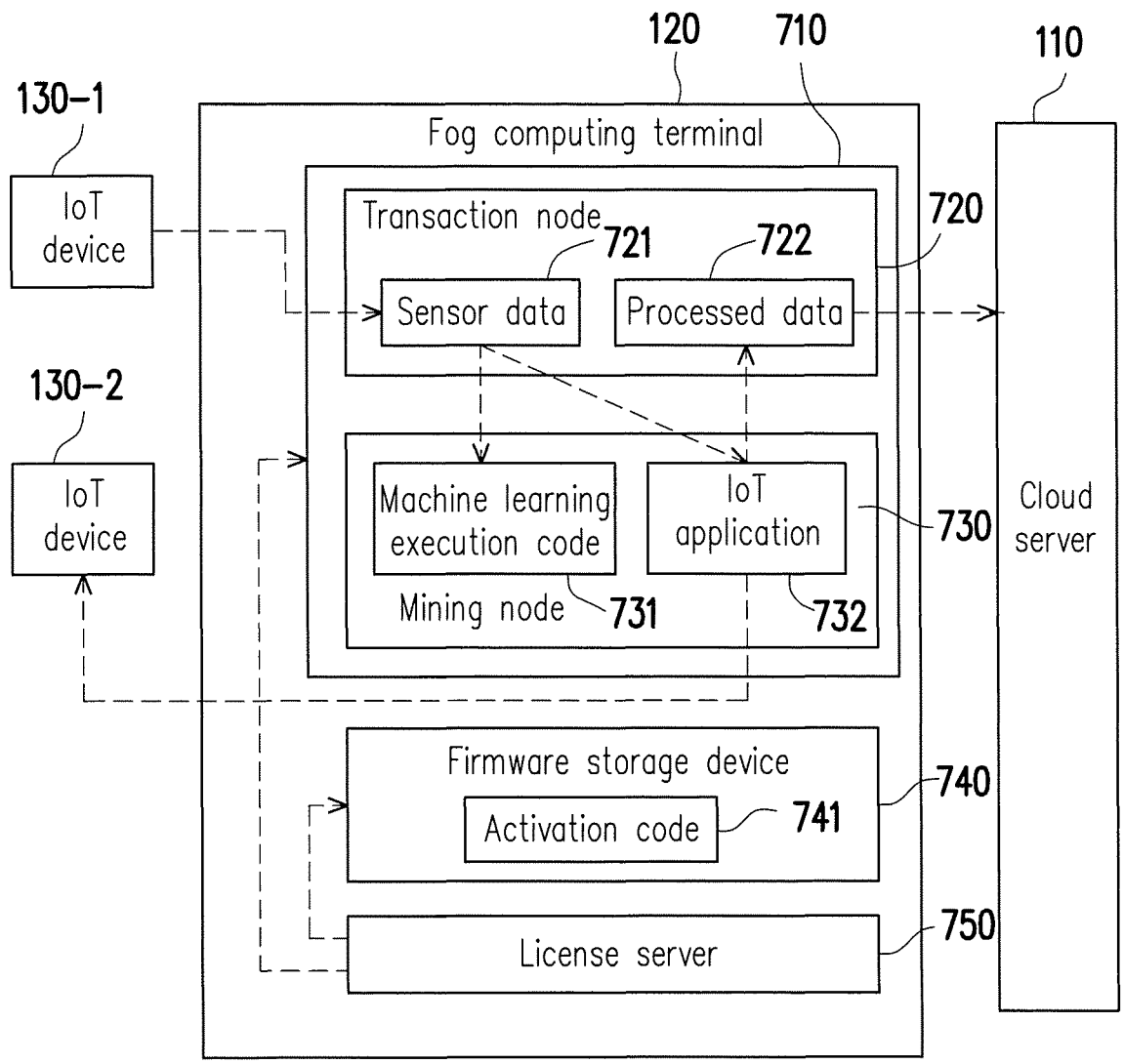
FIG. 7 is a schematic diagram of a data transmission procedure based on a fog computing terminal in a monitoring system according to an embodiment of the invention.

FIG. 7 is a schematic diagram of a data transmission procedure based on the fog computing terminal in a monitoring system according to an embodiment of the invention. Referring to FIG. 7, in the present embodiment, dotted line arrows are used for representing transmission of data.

A blockchain structure 710 of the fog computing terminal 120 includes a transaction node 720 and a mining node 730, where the transaction node 720 and the mining node 730 can be set in different edge devices 121, and can be set in a same edge device 121. Moreover, the fog computing terminal 120 includes a firmware storage device 740 and a license server 750. The firmware storage device 740 is disposed in the edge device 121 executing the IoT application 732. After the fog computing terminal 120 receives an activation code 741, the license server 750 stores the activation code 741 in the firmware storage device 740.

The fog computing terminal 120 may receive sensor data 721 from the IoT device 130-1, and stores the sensor data 721 in the transaction node 720. Moreover, the mining node 730 executes a machine learning code 731 to execute incremental learning to the sensor data 721. Moreover, the IoT application 732 of the mining node 730 verifies the sensor data 721, and transmits the verified processed data 722 to the transaction node 720, and the transaction node 720 re-verifies the processed data 722. After the re-verification is successful, the processed data 722 can be further transmitted to the cloud server 110. Moreover, the IoT application 732 may further control the IoT device 130-2.

According to the above description, the cloud server obtains the general model through batch training of data of general sample patients or representative data. The general model downloaded to the fog computing terminal from the cloud server does not include data corresponding to a specific patient. Therefore, the fog computing terminal obtains raw data (i.e. sensor data) related to the specific patient from the IoT device to further train the general model, so as to obtain the incrementally learning model closer to the specific patient. Therefore, prediction of the specific patient can be more accurate through the incrementally learning model. The incrementally learning model can be run on the fog computing terminal or run on the IoT device.

The IoT application may read an output of the incrementally learning model coming from the fog computing terminal or the IoT device, and perform corresponding processing. For example, the IoT application may dynamically adjust instrument parameters according to a blood pressure prediction obtained through the incrementally learning model. For example, in hemodialysis, if it is predicted that a blood pressure of a patient is going to be decreased, it presents that the patient may probably have a life-threatening emergency, so that the IoT application may adjust parameters of a hemodialysis instrument to increase the blood pressure of the patient. For example, the IoT device can be installed on the instrument, and the IoT application may send an instruction to the IoT device to adjust the parameters of the hemodialysis instrument.

Moreover, in other embodiments, the fog computing terminal can also be composed of one edge device. Namely, the fog computing terminal is a desktop computer, a notebook computer, a tablet computer, a smart phone, or other various electronic devices having a computation function. Another embodiment is provided below for further description.

Figure 8:
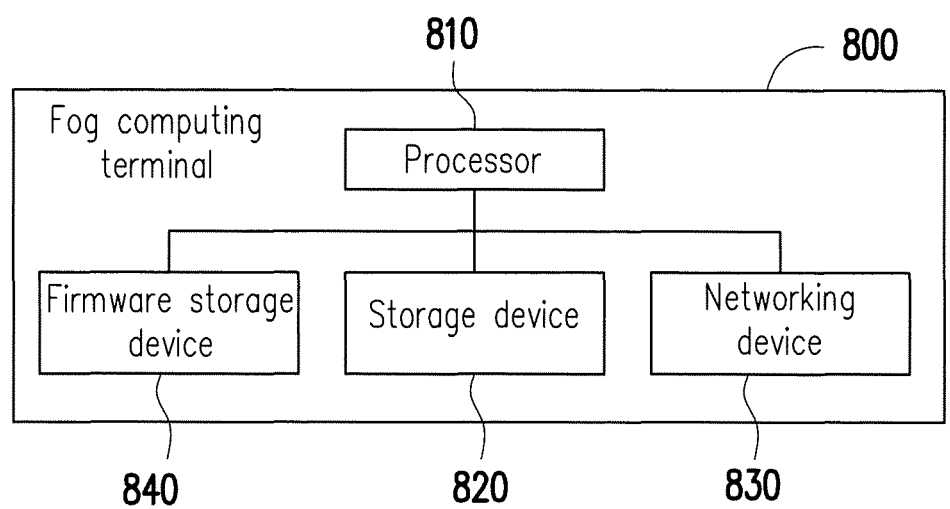
FIG. 8 is a block diagram of a fog computing terminal according to an embodiment of the invention.

FIG. 8 is a block diagram of a fog computing terminal according to an embodiment of the invention. In the present embodiment, the fog computing terminal 800 is composed of an edge device, and simultaneously serves as the transaction node and the mining node. The fog computing terminal 800 includes a processor 810, a storage device 820, a networking device 830 and a firmware storage device 840. The processor 810 is coupled to the storage device 820, the networking device 830 and the firmware storage device 840.

The processor 810 is, for example, a central processing unit (CPU), a physics processing unit (PPU), a programmable microprocessor, an embedded control chip, a digital signal processor (DSP), an application specific integrated circuits (ASIC) or other similar devices.

The storage device 820 is, for example, any type of a fixed or movable random access memory (RAM), a read-only memory (ROM), a flash memory, a hard disk or a combination of other similar devices or the above devices. The networking device 830 is a component having a networking function, for example, a wired network card or a wireless network card. The fog computing terminal 800 is connected to the cloud server 110 through the networking device 830.

The storage device 820 stores a plurality of program instructions, and after the program instructions are installed, the processor 810 executes the program instructions to implement the monitoring method based on IoT (the aforementioned steps S205-S220 can be referred for a detailed flow thereof). Namely, the processor 810 downloads the application packet from the cloud server 110 through the networking device 830, and stores the application packet to the storage device 820. The processor 810 executes the application packet, so as to download the general model from the cloud server 110 through the application packet, and stores the general model to the storage device 820. Then, the processor 810 sets one or a plurality of IoT devices 130 to a device group, so as to receive a plurality of sensor data from the device group, and executes an incremental learning based on the sensor data and the general model to obtain an incrementally learning model for controlling the device group through the incrementally learning model.

Moreover, the storage device 820 further includes a license application and a blockchain database. A function of the license application is the same to the aforementioned license server, so that description thereof may refer to the aforementioned description, and detail thereof is not repeated. Description of the blockchain database may also refer to the description of the aforementioned embodiment. The firmware storage device 840 is, for example, a memory storing BIOS, which is used for storing the activation code transmitted by the cloud server 110. In the present embodiment, the firmware storage device 840 and the storage device 820 are different components. In other embodiments, the firmware storage device 840 and the storage device 820 can also be a same hardware component, and according to different usages, the hardware component can be divided into two portions including the firmware storage device 840 and the storage device 820 for utilization In summary, the invention uses the fog computing terminal that is closer to the user to execute the incremental learning, so as to obtain a prediction result more suitable for the specific user. Moreover, the fog computing terminal adopting the blockchain application technique has following advantages: (1) high efficiency: pre-approval and post-reconciliation is unnecessary, and the application can be legally valid through multi-party digital signatures; (2) transparent: all of the courses of the transactions are clear and traceable, which improves the value of information; (3) security: data cannot be tampered or forged, and under attack of computer virus, as long as there is a normal transaction node, the application is not influenced and may continually operate normally.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A monitoring method based on Internet of Things, comprising:
   executing following steps through a fog computing terminal, comprising:
   downloading an application packet from a cloud server;
   analyzing the application packet to obtain an exchange code and a profile;
   transmitting the exchange code to the cloud server;
   downloading a general model from the cloud server through the exchange code of the application packet, wherein the general model is a model trained by the cloud server according to representative sensor data in advance;
   receiving, by the fog computing terminal, an activation code from the cloud server in response to transmitting, by the fog computing terminal, the exchange code to the cloud server, wherein the activation code records an available function;
   setting at least one of a plurality of Internet of Things devices to at least one device group, and receiving a plurality of sensor data from the device group according to the profile and the available function recorded in the activation code; and executing an incremental learning based on the sensor data and the general model to obtain an incrementally learning model and controlling the device group through the incrementally learning model, wherein after the cloud server receives the exchange code, the cloud server executing following steps, comprising:

determining whether the exchange code is received for the first time;

transmitting the activation code corresponding to the exchange code to the fog computing terminal when determining that the exchange code is received for the first time; and not transmitting the activation code to the fog computing terminal when determining that the exchange code has ever been received before.

2. The monitoring method based on Internet of Things as claimed in claim 1, wherein after the step of downloading the application packet from the cloud server, the monitoring method further comprises:

analyzing the application packet to obtain an Internet of Things application, and a machine learning execution code.

3. The monitoring method based on Internet of Things as claimed in claim 2, wherein after the step of receiving the activation code corresponding to the exchange code from the cloud server, the monitoring method further comprises:

downloading the general model from the cloud server through the Internet of Things application.

4. The monitoring method based on Internet of Things as claimed in claim 2, wherein the fog computing terminal comprises a license server, and after the step of receiving the activation code corresponding to the exchange code from the cloud server, the monitoring method further comprises:

respectively storing the activation code to a firmware storage device and a blockchain database of the fog computing terminal through the license server.

5. The monitoring method based on Internet of Things as claimed in claim 4, further comprising:

reading the activation code in the firmware storage device through the license server;

reading the activation code in the blockchain database through the license server;

determining whether the activation code obtained from the firmware storage device is the same to the activation code obtained from the blockchain database; and enabling a function of the Internet of Things application and setting an expiration date according to the activation code when the activation code obtained from the firmware storage device is the same to the activation code obtained from the blockchain database.

6. The monitoring method based on Internet of Things as claimed in claim 2, further comprising:

setting at least one of the Internet of Things devices to the device group through the Internet of Things application based on the profile.

7. The monitoring method based on Internet of Things as claimed in claim 1, further comprising:

transmitting the incrementally learning model to at least one of the Internet of Things devices by the fog computing terminal after obtaining the incrementally learning model.

8. The monitoring method based on Internet of Things as claimed in claim 1, further comprising:

uploading the sensor data of at least one of the Internet of Things devices to the cloud server, such that the cloud server updates the general model.

9. The monitoring method based on Internet of Things as claimed in claim 1, wherein the fog computing terminal comprises one or a plurality of edge devices, and each of the edge devices is determined to serve as at least one of a transaction node and a mining node based on a transaction volume, a computing capacity and storage capacity of each of the edge devices.

10. An Internet of Things system, comprising:

a cloud server, providing an application packet and a general model;

a plurality of Internet of Things devices; and a fog computing terminal, connected to the cloud server and the Internet of Things devices through a network, wherein the fog computing terminal analyzes the application packet to obtain an exchange code and a profile, wherein the fog computing terminal downloads the application packet from the cloud server, the fog computing terminal transmits the exchange code to the cloud server;

the fog computing terminal downloads the general model from the cloud server through the exchange code of the application packet, wherein the general model is a model trained by the cloud server according to representative sensor data in advance;

the fog computing terminal receives an activation code from the cloud server in response to transmitting the exchange code to the cloud server, and the activation code records an available function, the fog computing terminal sets one or more of the Internet of Things devices to at least one device group according to the profile and the available function recorded in the activation code, receives a plurality of sensor data from the device group, the fog computing terminal executes an incremental learning based on the sensor data and the general model to obtain an incrementally learning model and controls the device group through the incrementally learning model, wherein after the cloud server receives the exchange code, the cloud server determines whether the exchange code is received for the first time, and transmits the activation code corresponding to the exchange code to the fog computing terminal when determining that the exchange code is received for the first time, and does not transmit the activation code to the fog computing terminal when determining that the exchange code has ever been received before.

11. The Internet of Things systemas claimed in claim 10, wherein the fog computing terminal analyzes the application packet to obtain an Internet of Things application, and a machine learning execution code.

12. The Internet of Things system as claimed in claim 11, wherein the fog computing terminal downloads the general model from the cloud server through the Internet of Things application.

13. The Internet of Things system as claimed in claim 11, wherein the fog computing terminal comprises a license server, and respectively stores the activation code to a firmware storage device and a blockchain database of the fog computing terminal through the license server.

14. The Internet of Things system as claimed in claim 13, wherein the fog computing terminal reads the activation code in the firmware storage device through the license server; reads the activation code in the blockchain database through the license server; determines whether the activation code obtained from the firmware storage device is the same to the activation code obtained from the blockchain database; and enables a function of the Internet of Things application and sets an expiration date according to the activation code when the activation code obtained from the firmware storage device is the same to the activation code obtained from the blockchain database.

15. The Internet of Things system as claimed in claim 11, wherein the fog computing terminal sets at least one of the Internet of Things devices to the device group through the Internet of Things application based on the profile.

16. The Internet of Things system as claimed in claim 10, wherein after the fog computing terminal obtains the incrementally learning model, the fog computing terminal transmits the incrementally learning model to at least one of the Internet of Things devices.

17. The Internet of Things system as claimed in claim 10, wherein the fog computing terminal uploads the sensor data of at least one of the Internet of Things devices to the cloud server, such that the cloud server updates the general model.

18. The Internet of Things system as claimed in claim 10, wherein the fog computing tenninal comprises one or a plurality of edge devices, and each of the edge devices is determined to serve as at least one of a transaction node and a mining node based on a transaction volume, a computing capacity and storage capacity of each of the edge devices.

19. A fog computing terminal, comprising:
a storage device;
a networking device, connected to a cloud server and a plurality of Internet of Things devices; and
a processor, coupled to the networking device and the storage device,
wherein the processor downloads an application packet from the cloud server through the networking device, wherein the processor analyzes the application packet to obtain an exchange code and a profile,
the processor transmits the exchange code to the cloud server,
the processor downloads a general model from the cloud server through the exchange code of the application packet, wherein the general model is a model trained by the cloud server according to representative sensor data in advance;
receiving, by the processor, an activation code from the cloud server in response to transmitting, by the processor, the exchange code to the cloud server, wherein the activation code records an available function, and stores the general model to the storage device, and
the processor sets at least one of the Internet of Things devices to at least one device group according to the profile and the available function recorded in the activation code, receives a plurality of sensor data through the device group, executes an incremental learning based on the sensor data and the general model to obtain an incrementally learning model and controls the device group through the incrementally learning model,
wherein after the processor transmits the exchange code to the cloud server such that the cloud server receives the exchange code, and then the cloud server determines whether the exchange code is received for the first time, and transmits the activation code corresponding to the exchange code to the fog computing terminal when determining that the exchange code is received for the first time, and does not transmit the activation code to the fog computing terminal when determining that the exchange code has ever been received before.

20. The fog computing terminal as claimed in claim 19, wherein
the processor analyzes the application packet to obtain an Internet of Things application, a machine learning execution code,
the processor enables a function of the Internet of Things application according to the activation code,
after obtaining the incrementally learning model, the processor transmits the incrementally learning model to at least one of the Internet of Things devices through the networking device.

21. The fog computing terminal as claimed in claim 20, further comprising:
a firmware storage device, coupled to the processor,
wherein the storage device further comprises a license application and a blockchain database,
after receiving the activation code corresponding to the exchange code from the cloud server, the processor respectively stores the activation code to the finnware storage device and the blockchain database through the license application,
wherein before enabling the function of the Internet of Things application, the processor respectively reads the activation code in the firmware storage device and the activation code in the blockchain database through the license application, and determines whether the activation code obtained from the firmware storage device is the same to the activation code obtained from the blockchain database,
when the activation code obtained from the firmware storage device is the same to the activation code obtained from the blockchain database, the processor enables the function of the Internet of Things application and sets an expiration date according to the activation code.

* * * * *